United States Patent
Mizobata

(10) Patent No.: US 10,493,872 B2
(45) Date of Patent: Dec. 3, 2019

(54) VEHICLE SEAT

(71) Applicant: TOYOTA BOSHOKU KABUSHIKI KAISHA, Aichi-ken (JP)

(72) Inventor: Hiroshi Mizobata, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/997,888

(22) Filed: Jun. 5, 2018

(65) Prior Publication Data
US 2018/0354393 A1 Dec. 13, 2018

(30) Foreign Application Priority Data
Jun. 9, 2017 (JP) .................................. 2017-114461

(51) Int. Cl.
*B60N 2/68* (2006.01)
*B60N 2/235* (2006.01)
*B60N 2/20* (2006.01)

(52) U.S. Cl.
CPC ............. *B60N 2/2352* (2013.01); *B60N 2/20* (2013.01); *B60N 2/682* (2013.01)

(58) Field of Classification Search
CPC ....... B60N 2/682; B60N 2/235; B60N 2/2352
See application file for complete search history.

(56) References Cited

U.S. PATENT DOCUMENTS

| 2005/0200184 | A1* | 9/2005 | Siegrist | .................... | B60N 2/20 |
| | | | | | 297/374 |
| 2011/0204691 | A1* | 8/2011 | Schuhmacher | ...... | B60N 2/2356 |
| | | | | | 297/354.12 |
| 2014/0232158 | A1* | 8/2014 | Sano | ........................ | B60N 2/68 |
| | | | | | 297/354.1 |
| 2014/0232161 | A1* | 8/2014 | Mitsuhashi | .............. | B60N 2/68 |
| | | | | | 297/452.18 |
| 2018/0056817 | A1* | 3/2018 | Mizobata | ............... | B60N 2/682 |
| 2018/0339613 | A1* | 11/2018 | Mizobata | ........... | B60N 2/42709 |

FOREIGN PATENT DOCUMENTS

| EP | 2460685 | A1 * | 6/2012 | ............... B60N 2/22 |
| JP | 2017-39483 | | 2/2017 | |

* cited by examiner

*Primary Examiner* — Timothy J Brindley
(74) *Attorney, Agent, or Firm* — Greenblum & Bernstein, P.L.C.

(57) ABSTRACT

A vehicle seat including: a cushion frame; a back frame; a recliner; and a clamping plate, wherein the clamping plate is provided with: a burring portion to which a projection portion of the recliner is fitted from an inner side thereof and an outer side thereof is fitted to a loosely fitted through hole of the back frame; and an abutting wall portion which is abutted on a standing wall portion of the back frame from an inner side in a radial direction, and wherein the clamping plate is fixed to the recliner in a state where the clamping plate and the recliner clamp the back frame by fitting the outer side of the burring portion to the loosely fitted through hole, fitting the inner side of the burring portion to the projection portion, and causing the abutting wall portion to be abutted on the standing wall portion.

6 Claims, 11 Drawing Sheets ial direction and extending in a direction substantially
VEHICLE SEAT

CROSS-REFERENCE TO RELATED APPLICATIONS

This application claims priority from Japanese Patent Application No. 2017-114461 filed on Jun. 9, 2017, the entire contents of which are incorporated herein by reference.

TECHNICAL FIELD

The disclosure relates to a vehicle seat.

BACKGROUND

In a vehicle seat having a back frame made of a non-ferrous material such as a composite resin material, when the back frame is coupled to a reclining mechanism, there is a structure in which the back frame is pressed against a recliner by a plate member and installed. In the technique described in JP-A-2017-39483, a through hole, into which a projection portion provided on a surface of the recliner facing a side frame is loosely fitted, is provided on a side frame lower end portion of the back frame made of the composite resin material. The plate member is provided with a burring portion to which the projection portion is fitted from an inner side thereof and an outer side thereof is fitted into the through hole. The plate member is fixed to the recliner in a state where the outer side of the burring portion is fitted to the through hole of the side frame and the projection portion of the recliner is fitted to the inner side the burring portion.

In the technique described in JP-A-2017-39483, a torsional moment applied from the side frame to the recliner is received only at a fitting portion between the outer side of the burring portion and the through hole of the side frame. Therefore, there is a problem that when attempting to increase the torsional moment in which the side frame can endure, it is necessary to increase thickness of the side frame, increase reinforcing fibers contained in a composite resin material constituting the side frame, etc. Accordingly, it is difficult to achieve weight reduction.

SUMMARY

In view of such a problem, an object of the disclosure is to provide a vehicle seat which is possible for the weight reduction by installing a back frame to a reclining mechanism with a simple structure in the vehicle seat having the back frame made of a non-ferrous material.

According to an aspect of the disclosure, there is provided a vehicle seat including: a cushion frame; a back frame made of a non-ferrous material; a recliner which is arranged between a rear portion side of the cushion frame and a lower portion side of the back frame and supports the back frame to be relatively rotatable with respect to the cushion frame; and a clamping plate which clamps the back frame together with the recliner so as to fix the back frame with the recliner, wherein, on a surface of the recliner facing the back frame, a plurality of projection portions which are disposed on a circumference of a circle around a rotating shaft of the recliner are provided, wherein the lower portion side of the back frame is provided with: a loosely fitted through hole into which the projection portion is loosely fitted; and a standing wall portion arranged at a position which is away from the rotating shaft than the loosely fitted through hole in a radial direction and extending in a direction substantially perpendicular to the radial direction and toward the clamping plate side, wherein the clamping plate is provided with: a burring portion to which the projection portion is fitted from an inner side thereof and an outer side thereof is fitted to the loosely fitted through hole of the back frame; and an abutting wall portion which is planarly abutted on the standing wall portion from an inner side in the radial direction, and wherein the clamping plate is fixed to the recliner in a state where the clamping plate and the recliner clamp the back frame by fitting the outer side of the burring portion to the loosely fitted through hole, fitting the inner side of the burring portion to the projection portion, and causing the abutting wall portion to be abutted on the standing wall portion.

Accordingly, the lower portion side of the back frame made of the non-ferrous material is fixed to the recliner by being clamped by the clamping plate and the recliner. At this time, relative rotation of the back frame and the clamping plate is stopped not only by a fitting of an outer peripheral wall portion of the loosely fitted through hole and the outer side of the burring portion but also by an abutment of the standing wall portion and the abutting wall portion. Therefore, in a case where a strong torsional moment from the back frame is transmitted to the recliner, it is possible to compensate for connecting strength by fitting the outer peripheral wall portion of the loosely fitted through hole and the outer side of the burring portion with a simple structure in which the standing wall portion and the abutting wall portion are provided. Since weight which is increased by providing the standing wall portion and the abutting wall portions is slight, weight reduction of the vehicle seat can be achieved.

DETAILED DESCRIPTION

FIGS. 1 to 6 show an embodiment of the disclosure. The present embodiment is an example in which the disclosure is applied to an automobile seat. In each figure, the respective directions of an automobile seat 1 and an automobile when the automobile seat 1 is installed to a floor F of the automobile are shown by the arrows. In the following description, directions are explained with reference to these directions.

Figure 1:
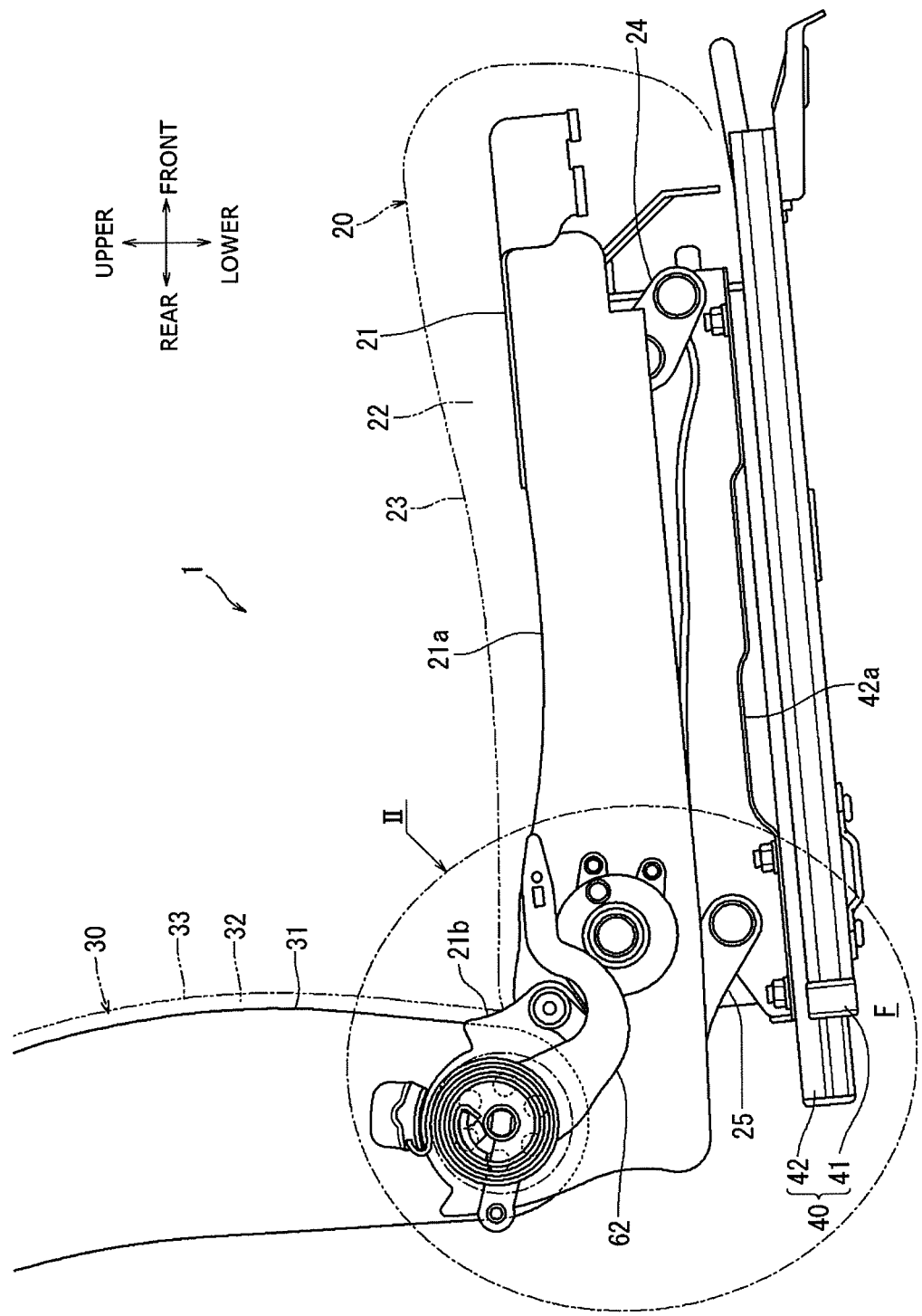
FIG. 1 is a side view of an automobile seat according to a first embodiment of the disclosure.

As shown in FIG. 1, the automobile seat 1 of the present embodiment is a front seat for a passenger car, and includes a seat cushion 20 serving as a seat portion, a seat back 30 serving as a backrest, and slide rails 40 for installing the seat cushion 20 so as to be slidable in a front-rear direction with respect to the floor F. Here, the automobile seat 1 corresponds to the "vehicle seat" in the claims.

Figure 3:
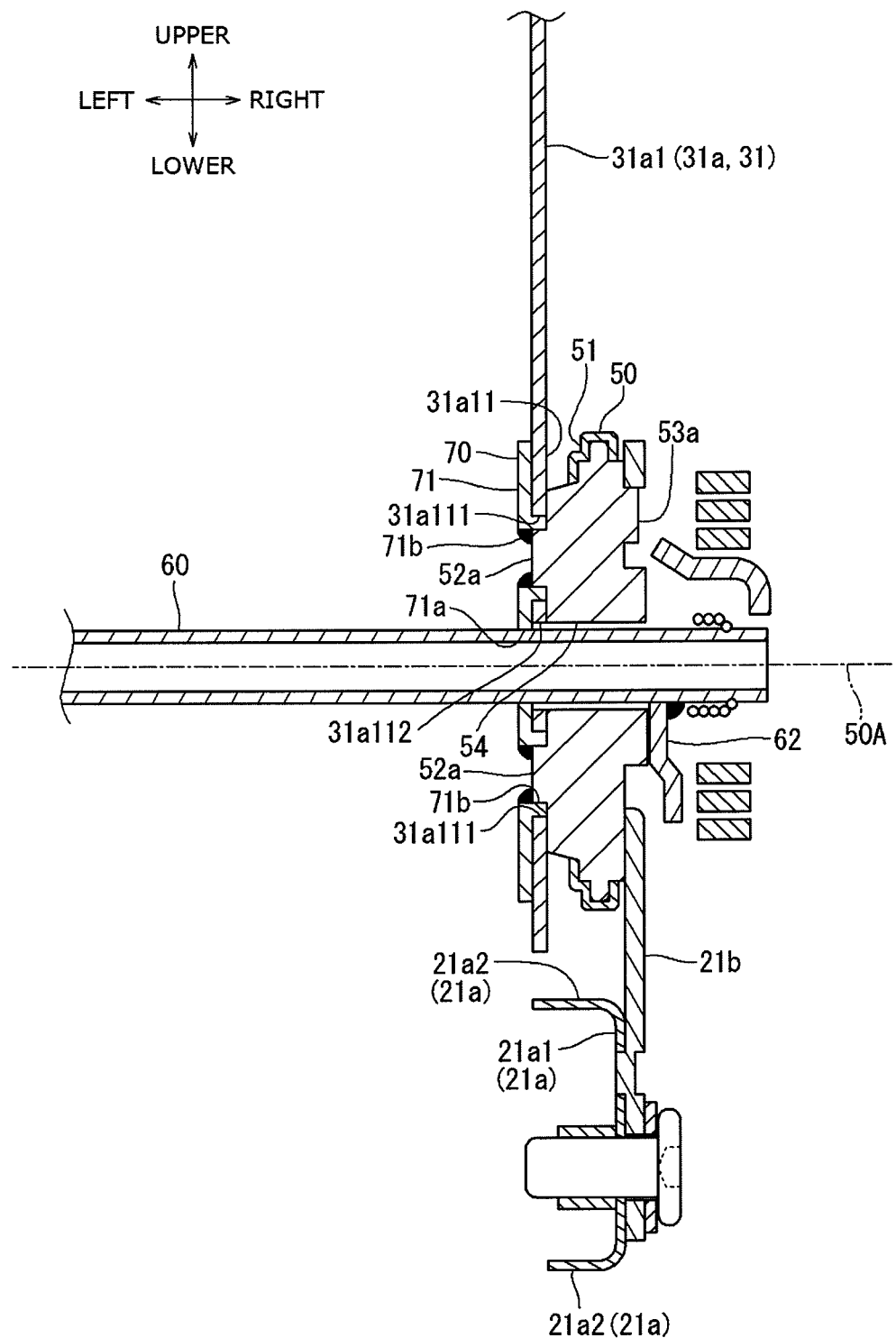
FIG. 3 is a sectional view taken along an arrow line in FIG. 2.

The seat cushion 20 is configured such that a cushion pad 22 which is a cushion material is placed on a cushion frame 21 forming a framework and is covered with a cushion cover 23 which is a cover material from above. The seat cushion 20 elastically supports a load of a seated person. In the cushion frame 21, front end sides of a pair of left and right side frames 21a made of a steel plate material extending in the front-rear direction are connected to each other by a front pipe (not shown) in a bridging manner so as to be relatively rotatable, and rear end sides are connected to each other by a rear pipe 21c in the bridging manner so as to be relatively rotatable. Therefore, the cushion frame 21 is formed in a rectangular frame shape along an outer peripheral shape of the seat cushion 20 in a top view. As shown in FIG. 3, a side frame 21a is a member formed with standing wall portions 21a2 extending respectively to left sides (seat inner side) from upper and lower end portions of a plate-like main body portion 21a1 which extends in the front-rear direction and perpendicularly to the floor F. The standing wall portions 21a2 are formed for reinforcement. In the side frame 21a, a lower arm 21b is installed respectively to an upper part a rear end side portion of the main body portion 21a1 by fastening members such as bolts. The lower arm 21b is a member made of a thicker steel plate material as compared with the side frame 21a, and is provided with a hole capable of welding and fixing the abutted surface of a seat outer side of the later-described recliner 50.

Figure 5:
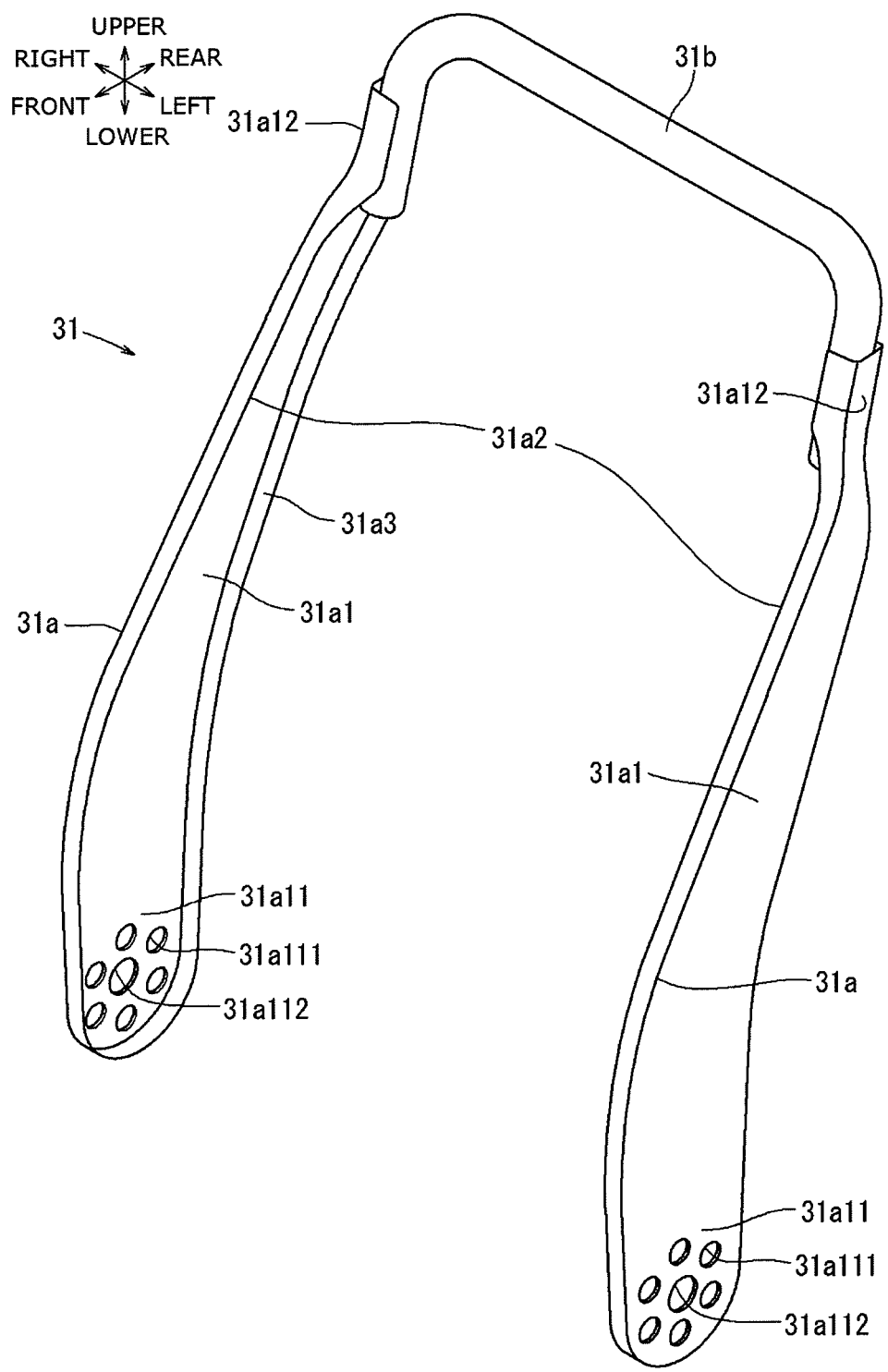
FIG. 5 is a perspective view of a back frame of the automobile seat according to the above embodiment.

The seat back 30 is configured such that a back pad 32 which is the cushion material is placed on a back frame 31 forming a framework and is covered with a back cover 33 which is the cover material from above. The seat back 32 elastically supports a back portion of the seated person. As shown in FIG. 5, the back frame 31 is configured such that upper end portions of a pair of left and right side frames 31a made of an aluminum alloy material extending in an upper-lower direction are connected to each other by an upper pipe 31b made of an aluminum alloy pipe material formed in an inverted U shape in a front view. Wires (not shown) which support the back pad 32 are arranged between the left and right side frames 31a in the bridging manner.

As shown in FIG. 5, the left and right side frames 31a are manufactured by press-forming an aluminum alloy plate material, and are formed symmetrically with respect to a surface extending in the front-rear direction at a center portion of the back frame 31 in a left-right direction. The left and right side frames 31a have a main surface portion 31a1 in which width in the front-rear direction gradually decreases from a lower side toward an upper side in a side view, a front flange portion 31a2 extending in a direction close to each other from a front end portion of the main surface portion 31a1, and a rear flange portion 31a3 extending in the direction close to each other from a rear end portion of the main surface portion 31a1. The front flange portion 31a2 and the rear flange portion 31a3 are connected by the lower end portion of the side frame 31a. A lower side portion 31a11, which is a portion where the width of a lower end side of the main surface portion 31a1 in the front-rear direction is wide, is provided with six dowel holes 31a111 into which six dowels 52a formed on a surface of the later-described recliner 50 is loosely fitted, and a through hole 31a112 through which the rotating shaft 50A of the recliner 50 passes.

When the back frame 31 is set in an upright state with respect to the cushion frame 21, the front flange portion 31a2 and the rear flange portion 31a3 substantially face each other and extend in the upper-lower direction at the front and rear of the lower side portion 31a11. In an upper side portion 31a12, which is a portion where the width of an upper end side of the main surface portion 31a1 in the front-rear direction is narrow, an interval between the front flange portion 31a2 and the rear flange portion 31a3 in the front-rear direction is narrowed, and a lower side end portion of the upper pipe 31b is connected in a state of being clamped therebeween. Here, the front flange portion 31a2 and the rear flange portion 31a3 correspond to the "standing wall portion" in the claims respectively. The lower side portion 31a 11 and the dowel hole 31a111 correspond to the "lower portion side" and "loosely fitted through hole" of the claims respectively.

In the slide rails 40, upper rails 42 are assembled so as to be slidable in the front-rear direction with respect to the lower rails 41 extending in the front-rear direction and fixed to the floor F. Brackets 42a extending in the front-rear direction are installed to upper surfaces of the upper rails 42.

The cushion frame 21 is installed to the brackets 42a via a pair of front links 24 on front sides thereof, and via a pair of rear links 25 on the rear sides thereof. Specifically, upper end portions of the front links 24 are rotatably installed to the front sides of both the left and right side frames 21a, and the upper end portions of the front links 24 are connected by the front pipe. Upper end portions of the rear links 25 are rotatably installed to the rear sides of both the left and right side frames 21a, and the upper end portions of the rear links 25 are connected by the rear pipe 21c. Further, lower end portions of the front links 24 are rotatably installed to the front sides of both the left and right brackets 42a, and lower end portions of the rear links 25 are rotatably installed to the rear sides of the brackets 42a. That is, four-joint link is formed by both the left and right side frames 21a, the front links 24, the rear links 25, and the brackets 42a, and meanwhile the upper end portions of the front links 24 and the upper end portions of the rear links 25 are connected by a pipe. A sector gear 25a is provided in one of the rear links 25, a pinion gear (not shown) which is rotatably supported by the side frame 21a meshes with the sector gear 25a, and the pinion gear is rotatable by a lifter lever. Therefore, when the lifter lever is operated to rotate the pinion gear, one of the rear links 25 rotates with respect to the side frame 21a, and this movement is also transmitted to the other rear links 25 and the front links 24 and moves up and down in a state where the cushion frame 21 kept substantially parallel with the slide rails 40.

Figure 2:
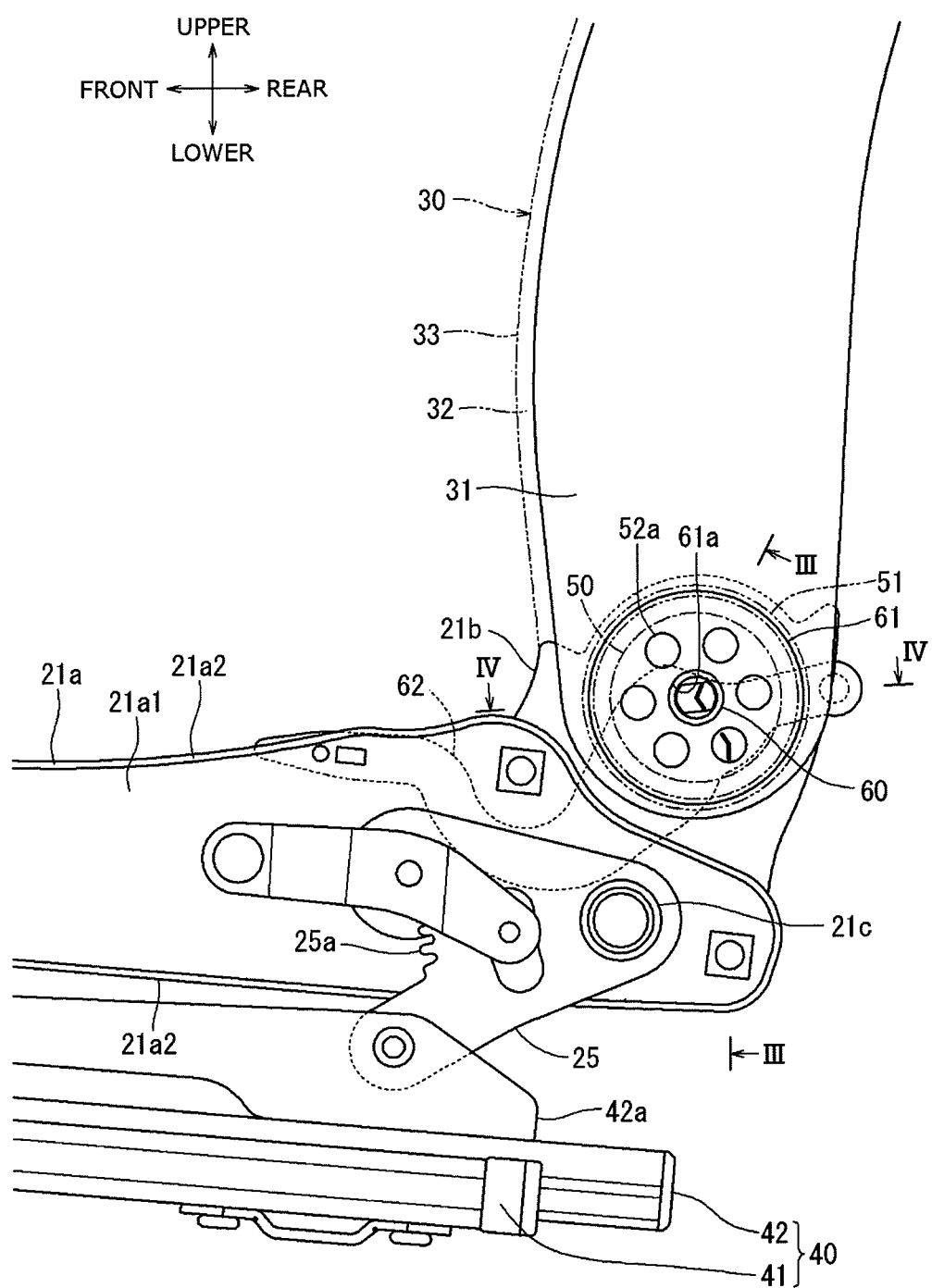
FIG. 2 is an enlarged view of a portion II in FIG. 1, viewed from a seat inner side.

The recliner 50 is a device in which a locking mechanism (not shown), which locks relative rotations between two disk-shaped connecting members (not shown) assembled in an axial direction in a state of being rotatable relative to each other, is provided between the two disk-shaped connecting members, and an outer periphery thereof is riveted and held with an outer peripheral ring 51. Since a basic configuration of the recliner 50 is a well-known configuration disclosed in documents such as JP-A-2002-360368, a detailed description thereof will be omitted. Since the left and right recliners 50 are in symmetrical relation with respect to the surface extending in the front-rear direction at an intermediate portion of the back frame 31 in the left-right direction, the right recliner 50 will be described as a representative. As shown in FIG. 2 and FIG. 3, on the connecting member which constitutes a left side surface (seat inner side surface) of the recliner 50, six dowels 52a protruding in a substantially cylindrical shape are formed side by side at equal intervals in a circumferential direction. Height of the dowel 52a is set to be substantially equal to thickness of the main surface portion 31a1 of the side frame 31a of the back frame 31. Four dowels 53a protruding in a substantially cylindrical shape are formed side by side at equal intervals in the circumferential direction on the connecting member which constitutes a right side surface (seat outer side surface) of the recliner 50. At a center of the recliner 50, a through hole 54 around the rotating shaft 50A of two disk-shaped connecting members is provided. When a later-described shaft 60 is passed through the through hole 54, the lock mechanism is engaged with the shaft 60 so that the relative rotation of the two connecting members can be locked or unlocked according to rotation of the shaft 60. Here, the dowel 52a corresponds to the "projection portion" in the claims.

Figure 4:
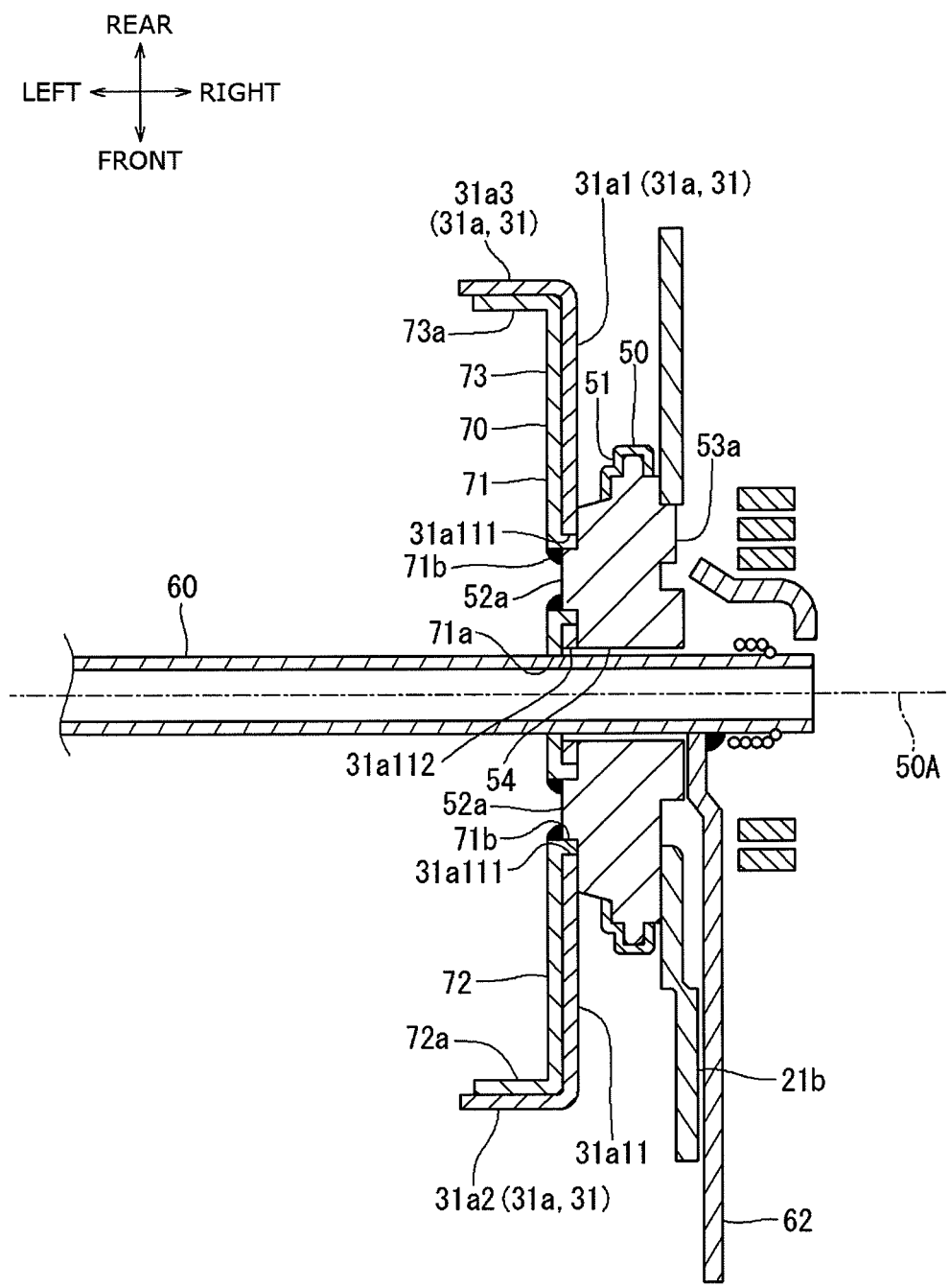
FIG. 4 is a sectional view taken along an arrow line IV-IV in FIG. 2.
Figure 6:
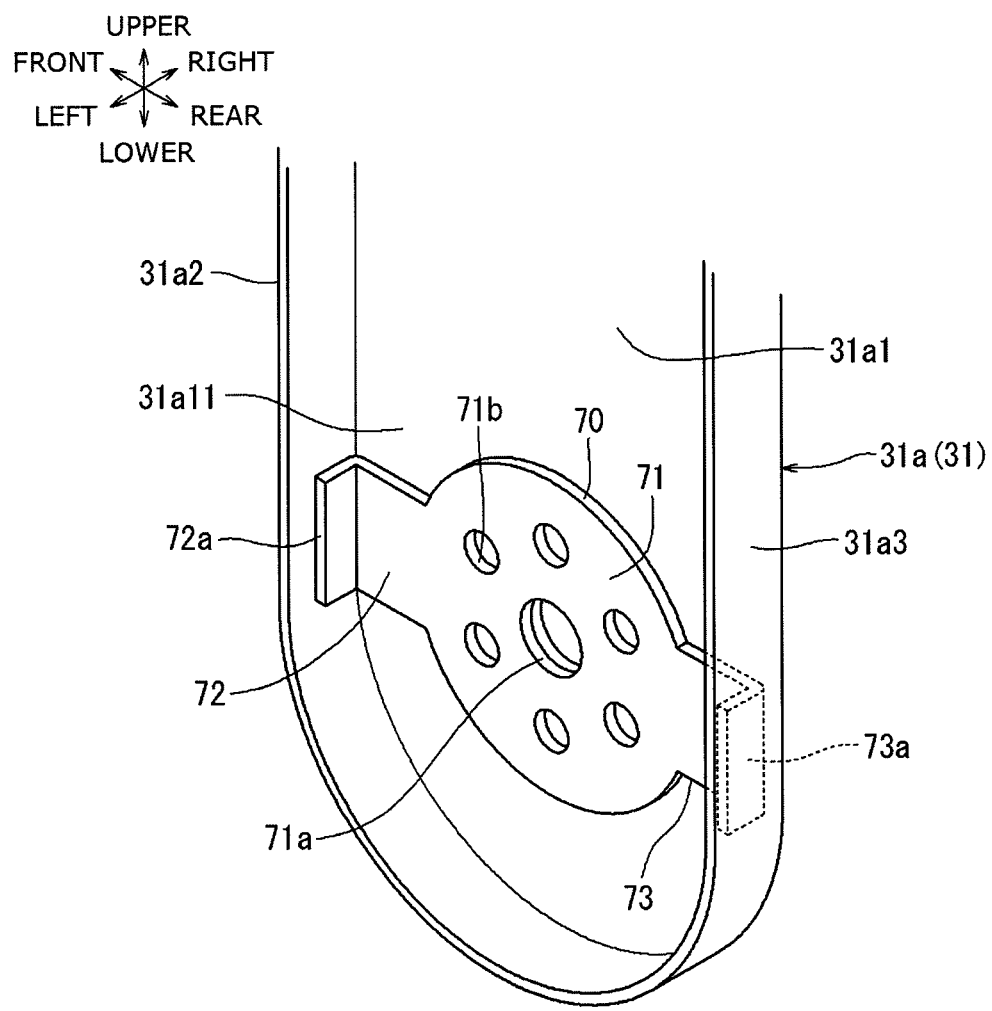
FIG. 6 is a perspective view showing a state where a clamping plate is installed to the back frame of the automobile seat according to the above embodiment.

As shown in FIGS. 3, 4 and 6, a clamping plate 70 is a member made of a steel plate, and has a disk-shaped body portion 71, and a front extending portion 72 and a rear extending portion 73 which extend from the body portion 71 toward outer sides in the radial direction. The body portion 71 is formed in a disk shape provided with a through hole 71a having an inner diameter slightly larger than an outer diameter of the shaft 60 at the center and having an outer diameter substantially equal to an outer diameter of the recliner 50. The body portion 71 is provided with six burring portions 71b in which the six dowels 52a of the recliner 50 are fitted to an inner side thereof respectively. Height of a cylindrical portion of the burring portion 71b is set to be slightly smaller than thickness of the main surface portion 31a1 of the side frame 31a of the back frame 31. An inner side diameter of the cylindrical portion of the burring portion 71b is set to be slightly larger than a diameter of the dowel 52a of the recliner 50. An outer side diameter of the cylindrical portion of the burring portion 71b is set to be slightly smaller than a diameter of the dowel hole 31a111 of the side frame 31a. Therefore, the lower side portion 31a11 of the side frame 31a is abutted on the recliner 50, and when clamped by the clamping plate 70, an inner side of the cylindrical portion of the burring portion 71b of the clamping plate 70 is fitted into the dowel 52a, and the outer side of the cylindrical portion is fitted to an outer peripheral wall portion of the dowel hole 31a111. When the back frame 31 is set in the upright state with respect to the cushion frame 21, the front extending portion 72 extends toward a front side in the radial direction, and the rear extending portion 73 extends toward a rear side in the radial direction. A front end side of the front extending portion 72 is formed as a front abutting wall portion 72a which is bent to a left side (seat inner side direction) at a right angle with respect to the clamping plate 70. A rear end side of the rear extending portion 73 is formed as a rear abutting wall portion 73a which is bent to the left side (seat inner side direction) at a right angle with respect to the clamping plate 70. When the recliner 50 and the clamping plate 70 are installed to the side frame 31a, a front surface of the front abutting wall portion 72a is abutted on a rear surface of the front flange portion 31a2, and a rear surface of the rear abutting wall portion 73a is abutted on a front surface of the rear flange portion 31a3. Here, the front abutting wall portion 72a and the rear abutting wall portion 73a correspond to the "abutting wall portion" in the claims.

A procedure for installing the back frame 31 to the lower arm 21b via the recliner 50 will be described with reference to FIGS. 3 and 4. First, the upper pipe 31b is connected to the left and right side frames 31a to form the back frame 31. Next, the six dowels 52a on the left side surface (seat inner side surface) of the recliner 50 are loosely fitted into the six dowel holes 31a111 of the back frame 31, and the six dowels 52a are fitted to the inner sides of the cylindrical portions of the six burring portions 71b of the clamping plate 70, thereby installing the clamping plate 70. At this time, structural adhesive of a room temperature curing type is applied in advance to the front surface of the front abutting wall portion 72a and the rear surface of the rear abutting wall portion 73a of the clamping plate 70. The outer sides of the cylindrical portions of the six burring portions 71b of the clamping plate 70 are fitted to the six dowel holes 31a111 of the back frame 31. In this state, some of the six burring portions 71b of the clamping plate 70 and the dowels 52a of the recliner 50 fitted thereto are fixed by welding. At this time, the front surface of the front abutting wall portion 72a of the clamping plate 70 is abutted on the rear surface of the front flange portion 31a2 of the side frame 31a via adhesive, and the rear surface of the rear abutting wall portion 73a of the clamping plate 70 is abutted on the front surface of the rear flange portion 31a3 of the side frame 31a via the adhesive. The recliner 50 and the clamping plate 70 are similarly installed to the left side frame 31a. Finally, the left and right lower arms 21b are installed to the cushion frame 21, the shaft 60 is disposed so as to extend between the through holes 54 of the left and right recliners 50, and a reclining lever 62 is disposed by slidably abutting to the right side surface of the right recliner 50 and is welded and fixed to an outer peripheral portion of the shaft 60. The adhesive between the front flange portion 31a2 and the front abutting wall portion 72a, and the adhesive between the rear flange portion 31a3 and the rear abutting wall portion 73a hardens to exhibit predetermined strength before mounting a manufactured automobile seat 1 on the automobile.

A first embodiment configured as described above exhibits the following operational effects. The six dowels 52a of the left and right recliners 50 are loosely fitted into the six dowel holes 31a111 provided on the left and right main surface portions 31a1, and the side frame 31a is clamped by the recliner 50 and the clamping plate 70 so as to be fixed. At this time, the front abutting wall portion 72a and the rear abutting wall portion 73a of the clamping plate 70 are abutted on the front flange portion 31a2 and the rear flange portion 31a3 of the side frame 31a respectively. Therefore, in a case where a strong torsional moment from the back frame 31 is transmitted to the recliner 50, it is possible to compensate for connecting strength by fitting the outer peripheral wall portion of the dowel hole 31a111 and the outer side of the cylindrical portion of the burring portion 71b with a simple structure in which the front abutting wall portion 72a and the rear abutting wall portion 73a are provided to the clamping plate 70. Since weight which is increased by providing the front abutting wall portion 72a and the rear abutting wall portion 73a on the clamping plate 70 is slight, weight reduction of the automobile seat 1 can be achieved.

Since the front flange portion 31a2 and the rear flange portion 31a3 of the side frame 31a are flange portions integrally provided on an outer peripheral edge portion of the main surface portion 31a1, it is not necessary to install a separate member, so that the structure is simplified and the weight reduction is promoted. Since the front abutting wall portion 72a and the rear abutting wall portion 73a are provided respectively to face each other with the rotating shaft 50A located therebetween, the connecting strength can be enhanced in a well-balanced manner. Further, the front flange portion 31a2 and the front abutting wall portion 72a, and the rear flange portion 31a3 and the rear abutting wall portion 73a are connected by adhesion with the adhesive interposed therebetween. Therefore, strength against the torsional moment applied from the side frame 31a can be further enhanced. In addition, since the back frame 31 is made of light alloy of aluminum alloy, the weight reduction can be further achieved.

Figure 7:
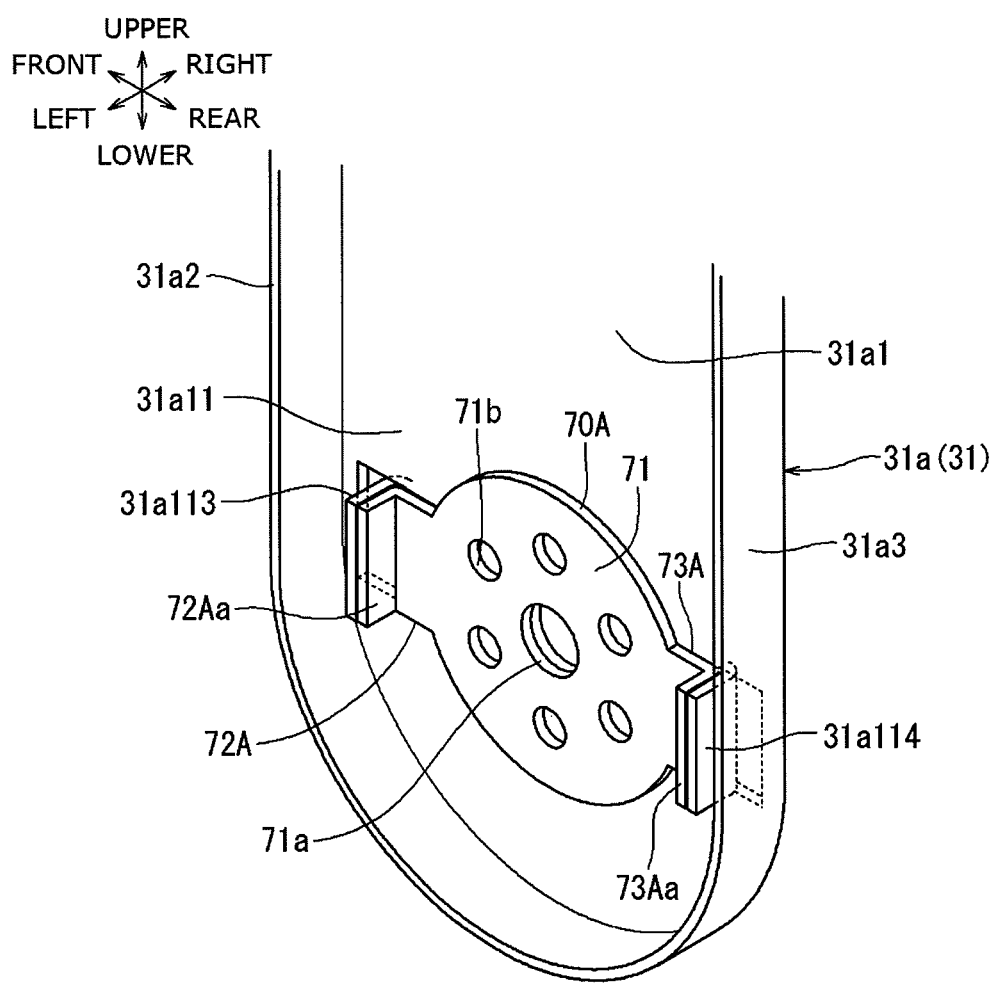
FIG. 7 is a perspective view showing a second embodiment of the disclosure.

FIG. 7 shows a second embodiment of the disclosure. Corresponding reference numerals are attached to structures in common with the first embodiment, and a detailed description thereof will be omitted. The difference from the first embodiment is that the abutting wall portion of the clamping plate and the standing wall portion of the back frame are different. On the lower side portion 31a11 of the side frame 31a, a front cut-and-raised portion 31a113 extending up and down in parallel with the front flange portion 31a2 is formed between a circumscribed circle of the six dowel holes 31a111 and the front flange portion 31a2. On the lower side portion 31a11 of the side frame 31a, a rear cut-and-raised portion 31a114 extending up and down in parallel with the rear flange portion 31a3 is formed between the circumscribed circle of the six dowel holes 31a111 and the rear flange portion 31a3. Length of the front cut-and-raised portion 31a113 and the rear cut-and-raised portion 31a114 in the upper-lower direction is set to about ½ of a diameter of the body portion 71 of a clamping plate 70A. On the body portion 71 of the clamping plate 70A, a front abutting wall portion 72Aa is formed at a front end side of the front extending portion 72A so as to correspond to the front cut-and-raised portion 31a113, and a rear abutting wall portion 73Aa is formed at the rear end side of the rear extending portion 73A so as to correspond to the rear cut-and-raised portion 31a114. Here, the front cut-and-raised portion 31a113 and the rear cut-and-raised portion 31a114 correspond to the "standing wall portion" in the claims.

The six dowels 52a on the left side surface (seat inner side surface) of the recliner 50 are loosely fitted into the six dowel holes 31a111 of the back frame 31, and the six dowels 52a are fitted to the inner sides of the cylindrical portions of the six burring portions 71b of the clamping plate 70A, thereby installing the clamping plate 70A. At this time, the structural adhesive of the room temperature curing type is applied in advance to the front surface of the front abutting wall portion 72Aa and the rear surface of the rear abutting wall portion 73Aa of the clamping plate 70A. The outer sides of the cylindrical portions of the six burring portions 71b of the clamping plate 70A are fitted into the six dowel holes 31a111 of the back frame 31. In this state, some of the six burring portions 71b of the clamping plate 70A and the dowels 52a of the recliner 50 fitted thereto are fixed by welding. At this time, the front surface of the front abutting wall portion 72Aa of the clamping plate 70A is abutted on a rear surface of the front cut-and-raised portion 31a113 of the side frame 31a via the adhesive, and the rear surface of the rear abutting wall portion 73Aa of the clamping plate 70A is abutted on a front surface of the rear cut-and-raised portion 31a114 of the side frame 31a via the adhesive. The recliner 50 and the clamping plate 70A are similarly installed to the left side frame 31a. Here, the front abutting wall portion 72Aa and the rear abutting wall portion 73Aa correspond to the "abutting wall portion" in the claims.

The second embodiment configured as described above substantially exhibits the same operational effects as the first embodiment. In addition, length of the front extending portion 72A and the rear extending portion 73A in the left-right direction is shorter than that of the front extending portion 72 and the rear extending portion 73 respectively, so that the weight reduction can be further achieved.

Figure 8:
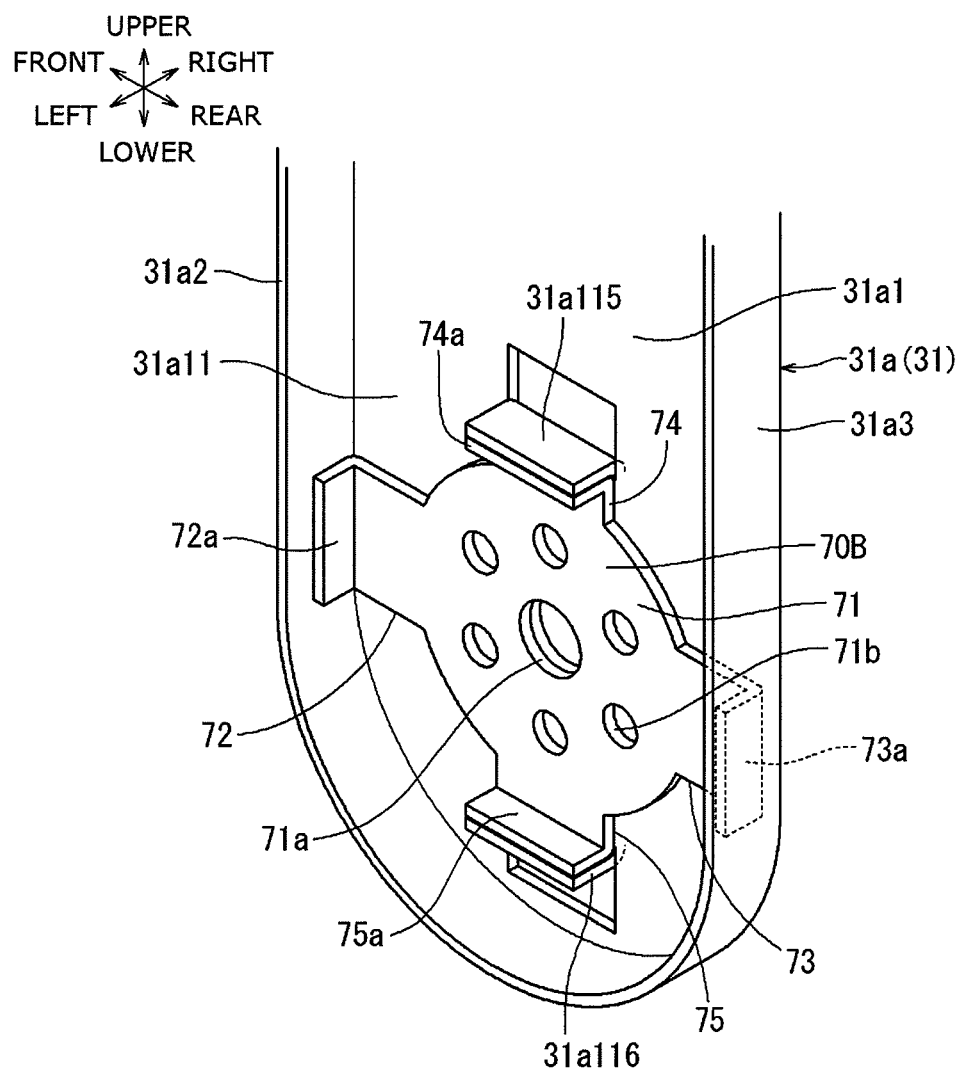
FIG. 8 is a perspective view showing a third embodiment of the disclosure.

FIG. 8 shows a third embodiment of the disclosure. Corresponding reference numerals are attached to structures in common with the first embodiment, and the detailed description thereof will be omitted. The difference from the first embodiment is that the abutting wall portion of the clamping plate and the standing wall portion of the back frame are different, and the first embodiment and the second embodiment are combined. On the lower side portion 31a11 of the side frame 31a, an upper cut-and-raised portion 31a115 extending left and right and being perpendicular to the front flange portion 31a2 is formed on an upper portion of the circumscribed circle of the six dowel holes 31a111. On the lower side portion 31a11 of the side frame 31a, a lower cut-and-raised portion 31a116 extending left and right and being perpendicular to the rear flange portion 31a3 is formed on a lower portion of the circumscribed circle of the six dowel holes 31a111. Length of the upper cut-and-raised portion 31a115 and the lower cut-and-raised portion 31a116 in the left-right direction is set to about ½ of the diameter of the body portion 71 of a clamping plate 70B. On the body portion 71 of the clamping plate 70B, in addition to the front extending portion 72 and the rear extending portion 73, an upper abutting wall portion 74a is formed at an upper end side of an upper extending portion 74 so as to correspond to the upper cut-and-raised portion 31a115, and a lower abutting wall portion 75a is formed at a lower end side of an lower extending portion 75 so as to correspond to the lower cut-and-raised portion 31a116. Here, the upper cut-and-raised portion 31a115 and the lower cut-and-raised portion 31a116 correspond to the "standing wall portion" in the claims.

The six dowels 52a on the left side surface (seat inner side surface) of the recliner 50 are loosely fitted into the six dowel holes 31a111 of the back frame 31, and the six dowels 52a are fitted to the inner sides of the cylindrical portions of the six burring portions 71b of the clamping plate 70B, thereby installing the clamping plate 70B. At this time, the structural adhesive of the room temperature curing type is applied in advance to the front surface of the front abutting wall portion 72a, the rear surface of the rear abutting wall portion 73a, an upper surface of the upper abutting wall portion 74a and a lower surface of the lower abutting wall portion 75a of the clamping plate 70B. The outer sides of the cylindrical portions of the six burring portions 71b of the clamping plate 70B are fitted into the six dowel holes 31a111 of the back frame 31. In this state, some of the six burring portions 71b of the clamping plate 70B and the dowels 52a of the recliner 50 fitted thereto are fixed by welding. At this time, the front surface of the front abutting wall portion 72a of the clamping plate 70B is abutted on the rear surface of the front flange portion 31a2, the rear surface of the rear abutting wall portion 73a is abutted on the front surface of the rear flange portion 31a3, the upper surface of the upper abutting wall portion 74a is abutted on a lower surface of the upper cut-and-raised portion 31a115, and the lower surface of the lower abutting wall portion 75a is abutted on an upper surface of the lower cut-and-raised portion 31a116 via the adhesive. The recliner 50 and the clamping plate 70B are similarly installed to the left side frame 31a. Here, the upper abutting wall portion 74a and the lower abutting wall portion 75a correspond to the "abutting wall portion" in the claims.

The third embodiment configured as described above substantially exhibits the same operational effects as the first embodiment. In addition, abutment of the upper abutting wall portion 74a and the upper cut-and-raised portion 31a115 and abutment of the lower abutting wall portion 75a and the lower cut-and-raised portion 31a116 are added to abutment of the front abutting wall portion 72a and the front flange portion 31a2 and abutment of the rear abutting wall portion 73a and the rear flange portion 31a3. Therefore, the strength against the torsional moment applied from the side frame 31a can be further enhanced.

Figure 9:
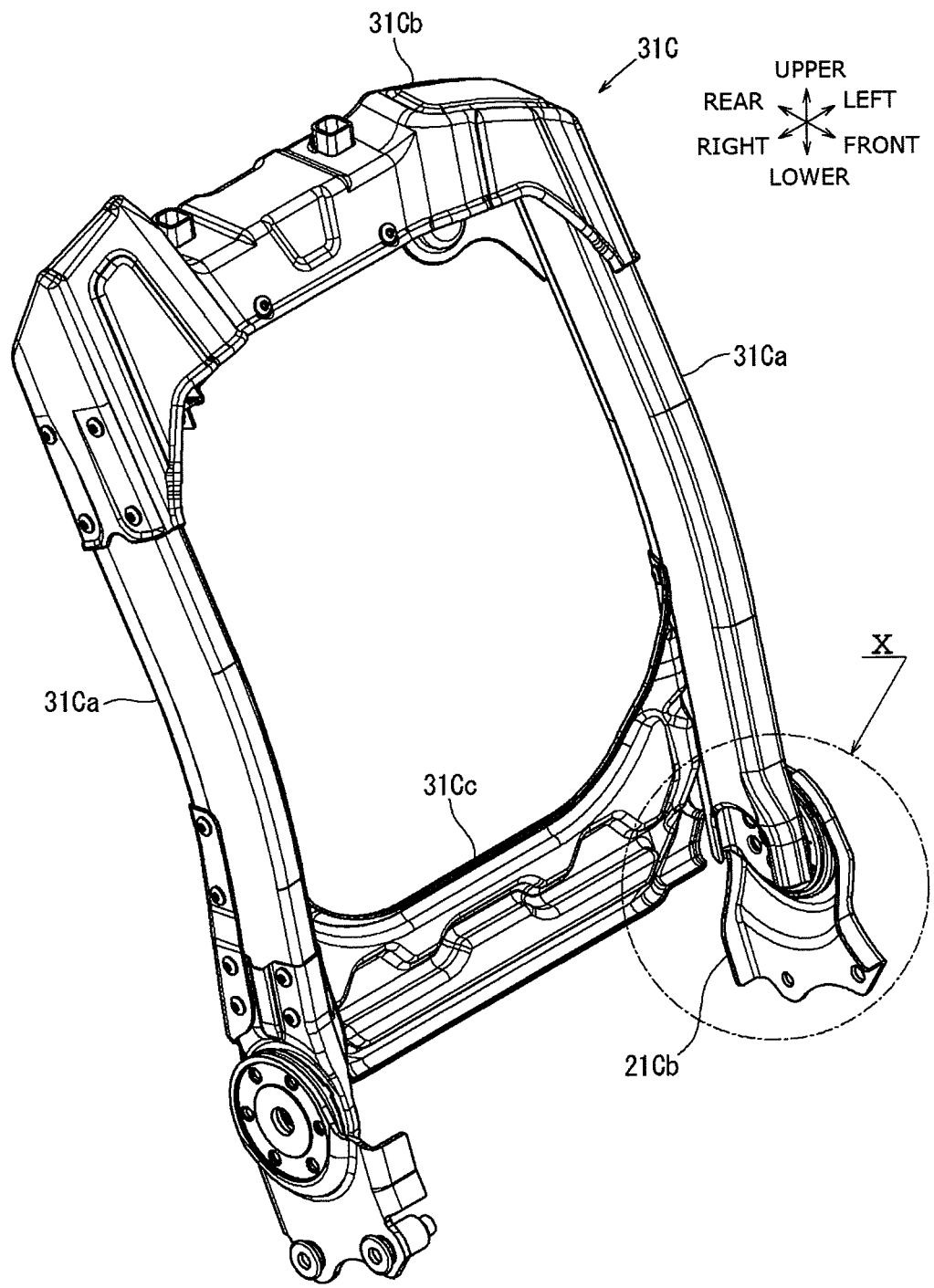
FIG. 9 is a perspective view of the back frame of the automobile seat according to a fourth embodiment of the disclosure.
Figure 10:
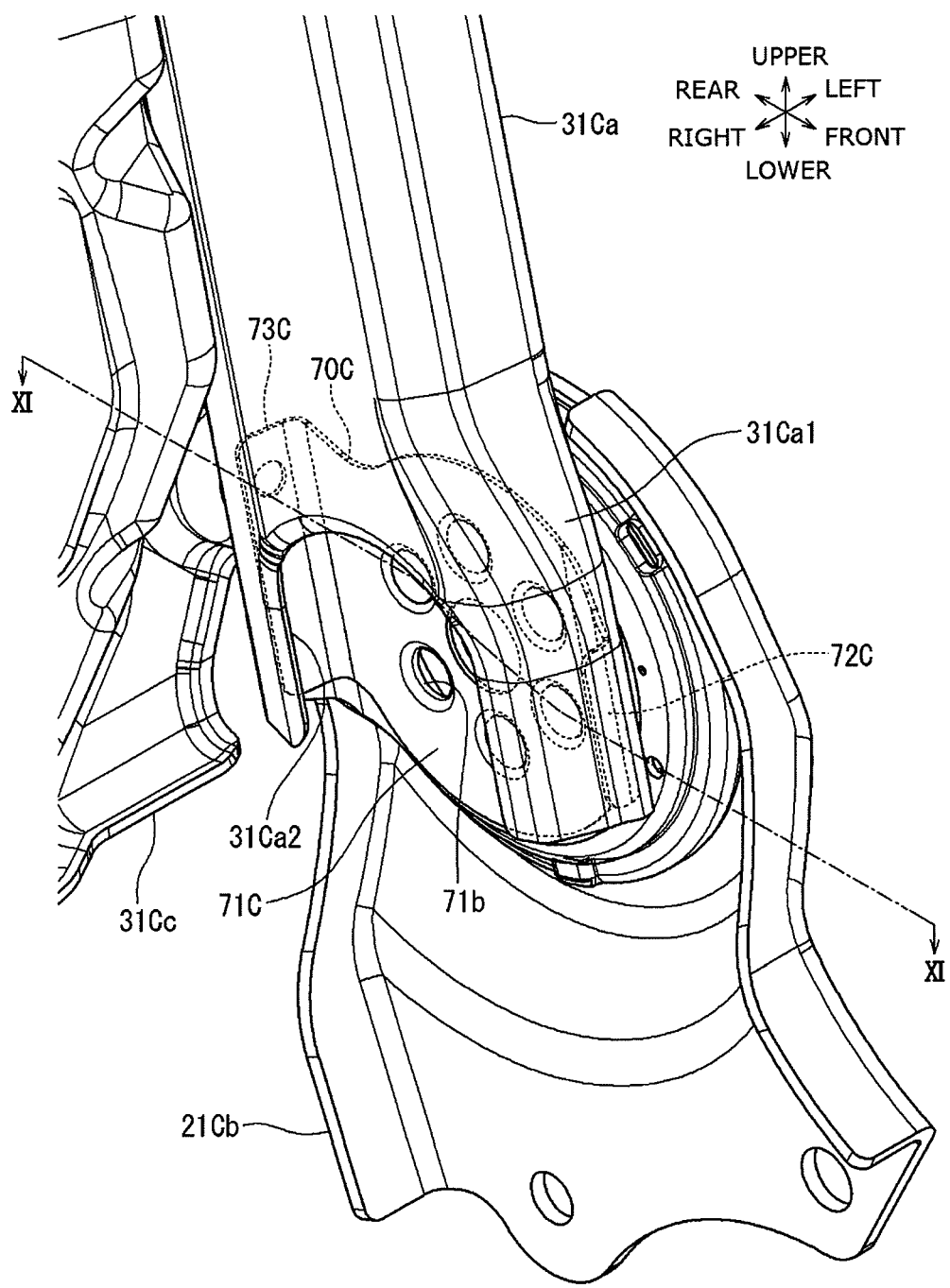
FIG. 10 is an enlarged view of a portion X in FIG. 9.
Figure 11:
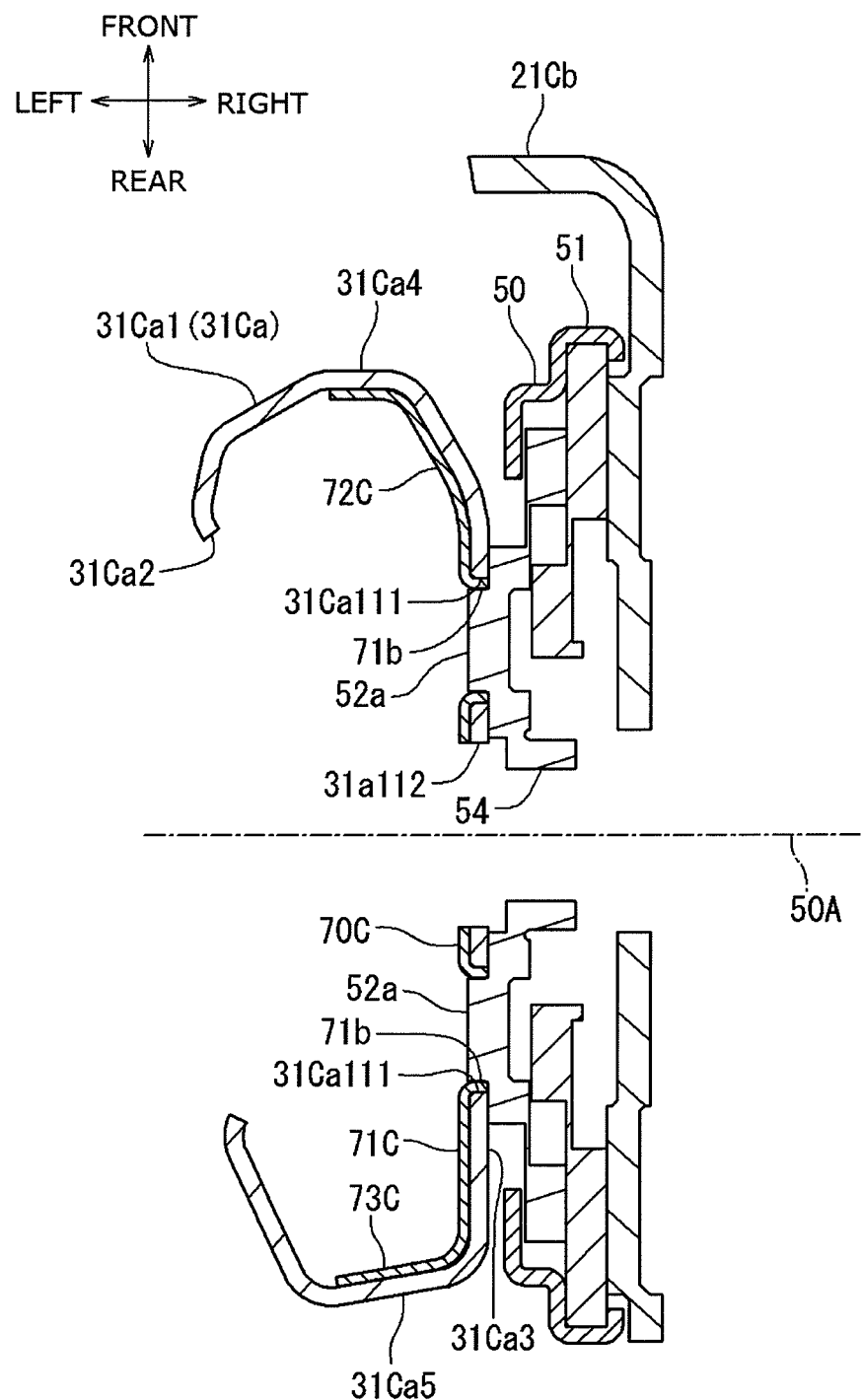
FIG. 11 is a sectional view taken along an arrow line XI-XI in FIG. 10.

FIG. 9 to FIG. 11 show a fourth embodiment of the disclosure. Corresponding reference numerals are attached to structures in common with the first embodiment, and the detailed description thereof will be omitted. The difference from the first embodiment is that the structure of the back frame is different. As shown in FIG. 9, a back frame 31C has a side frame 31Ca extending in the upper-lower direction on both side portions in the seat width direction, an upper frame 31Cb, and a lower frame 31Cc. The side frame 31Ca is made of an extruded material of aluminum alloy having a predetermined closed cross section as a cross sectional shape, and is formed by being folded so as to form a convex shape toward a front side in a vicinity of the center portion in the upper-lower direction. The upper frame 31Cb is a member made of a fiber reinforced composite resin and having a substantially inverted U shaped cross-section opened toward a lower side. The upper frame 31Cb is connected to the upper end portions of the left and right side frames 31Ca by rivets in a state of being covered from an upper side. The lower frame 31Cc is also a member made of the fiber reinforced composite resin and having a substantially U shape in the front view. The lower frame 31Cc is connected to the lower end portions of the left and right side frames 31Ca by rivets in a state of being covered from the rear side.

As shown in FIG. 10 and FIG. 11, the lower end portion of the left side frame 31Ca is formed as an expanded portion 31Ca1 which is expanded in the front-rear direction, and a notch portion 31Ca2 which is cut out in the substantially inverted U shape in a side view is provided on an inner side of the expanded portion 31Ca1. The expanded portion 31Ca1 of the side frame 31Ca is formed with a main surface portion 31Ca3 which is abutted on the left side surface of the recliner 50, a front surface portion 31Ca4 extending from a front end portion of the main surface portion 31Ca3 toward the front left side in a curved manner, and a rear surface portion 31Ca5 extending from a rear end portion of the main surface portion 31Ca3 toward the rear left side. The main surface portion 31Ca3 is provided with the six dowel holes 31a111 into which the six dowels 52a of the recliner 50 is loosely fitted, and the through hole 31a112 through which the rotating shaft 50A of the recliner 50 passes. The body portion 71C of a clamping plate 70C is formed such that when the six dowels 52a of the recliner 50 are loosely fitted into the six dowel holes 31a111, a right surface of main body 71C is abutted on a left surface of the main surface portion 31Ca3. A front end portion of the body portion 71C is provided with a front abutting wall portion 72C in which the front surface thereof is abutted on a rear surface of the front surface portion 31Ca4 when a right surface of the body portion 71C is abutted on the left surface of the main surface portion 31Ca3. Furthermore, a rear end portion of the body portion 71C is provided with a rear abutting wall portion 73C in which the rear surface thereof is abutted on the front surface of the rear surface portion 31Ca5 when the right surface of the body portion 71C is abutted on the left surface of the main surface portion 31Ca3. Here, the front surface portion 31Ca4 and the rear surface portion 31Ca5 correspond to the "standing wall portion" in the claims. The front abutting wall portion 72C and the rear abutting wall portion 73C correspond to the "abutting wall portion" of the claims. Further, the expanded portion 31Ca1 corresponds to the "lower portion side" in the claims.

The fourth embodiment configured as described above substantially exhibits the same operational effects as the first embodiment. In addition, the cross-section of the side frame 31Ca is a closed cross-sectional shape, and the lower end portion of the side frame 31Ca is partially cut off to form a front surface portion 31Ca4 and the rear surface portion 31Ca5. Therefore, the front surface portion 31Ca4 and the rear surface portion 31Ca5 in the upper-lower direction are short in length, and connected to each other on an upper end side, so that the strength against the torsional moment applied from the side frame 31Ca can be further enhanced.

Although specific embodiments have been described above, the disclosure is not limited to those appearances and configurations, and various modifications, additions and deletions are possible within the scope not changing the spirit of the disclosure. For example, the following can be mentioned.

1. In the above embodiments, the aluminum alloy is used as a material of the back frames 31 and 31C, but the disclosure is not limited thereto, and other light alloy such as magnesium alloy may be used. Further, a fiber reinforced composite resin which uses carbon fiber woven fabric or glass fiber fabric as a reinforcing material and uses thermosetting resin such as epoxy resin, phenol resin or unsaturated polyester resin as a matrix resin may be used. Further, a stampable sheet which is formed by compounding a reinforcing material such as carbon fiber or glass fiber with thermoplastic resin such as polypropylene or polyamide may be heated and cold pressed.

2. In the above embodiment, the front abutting wall portion 72a and the front flange portion 31a2, the rear abutting wall portion 73a and the rear flange portion 31a3, the upper abutting wall portion 74a and the upper cut-and-raised portion 31a115, and the lower abutting wall portion 75a and the lower cut-and-raised portion 31a116 are abutted via the adhesive. However, the disclosure is not limited thereto, and the front abutting wall portion 72a and the front flange portion 31a2, the rear abutting wall portion 73a and the rear flange portion 31a3, the upper abutting wall portion 74a and the upper cut-and-raised portion 31a115, and the lower abutting wall portion 75a and the lower cut-and-raised portion 31a116 may be connected by mechanical coupling means such as rivets or bolt nuts.

3. In the above embodiment, the disclosure is applied to a seat of the automobile. However, the disclosure may be applied to a seat mounted on a vehicle such as an airplane, a ship, or a train.

The disclosure provides illustrative, non-limiting examples as follows:

According to a first aspect of the disclosure, there is provided a vehicle seat including: a cushion frame; a back frame made of a non-ferrous material; a recliner which is arranged between a rear portion side of the cushion frame and a lower portion side of the back frame and supports the back frame to be relatively rotatable with respect to the cushion frame; and a clamping plate which clamps the back frame together with the recliner so as to fix the back frame with the recliner, wherein, on a surface of the recliner facing the back frame, a plurality of projection portions which are disposed on a circumference of a circle around a rotating shaft of the recliner are provided, wherein the lower portion side of the back frame is provided with: a loosely fitted through hole into which the projection portion is loosely fitted; and a standing wall portion arranged at a position which is away from the rotating shaft than the loosely fitted through hole in a radial direction and extending in a direction substantially perpendicular to the radial direction and toward the clamping plate side, wherein the clamping plate is provided with: a burring portion to which the projection portion is fitted from an inner side thereof and an outer side thereof is fitted to the loosely fitted through hole of the back frame; and an abutting wall portion which is planarly abutted on the standing wall portion from an inner side in the radial direction, and wherein the clamping plate is fixed to the recliner in a state where the clamping plate and the recliner clamp the back frame by fitting the outer side of the burring portion to the loosely fitted through hole, fitting the inner side of the burring portion to the projection portion, and causing the abutting wall portion to be abutted on the standing wall portion.

According to the first aspect, the lower portion side of the back frame made of the non-ferrous material is fixed to the recliner by being clamped by the clamping plate and the recliner. At this time, relative rotation of the back frame and the clamping plate is stopped not only by a fitting of an outer peripheral wall portion of the loosely fitted through hole and the outer side of the burring portion but also by an abutment of the standing wall portion and the abutting wall portion. Therefore, in a case where a strong torsional moment from the back frame is transmitted to the recliner, it is possible to compensate for connecting strength by fitting the outer peripheral wall portion of the loosely fitted through hole and the outer side of the burring portion with a simple structure in which the standing wall portion and the abutting wall portion are provided. Since weight which is increased by providing the standing wall portion and the abutting wall portions is slight, weight reduction of the vehicle seat can be achieved.

According to a second aspect of the disclosure, there is provided the vehicle seat according to the first aspect, wherein the standing wall portion includes at least one of a flange portion and a cut-and-raised portion provided on the lower portion side of the back frame.

According to the second aspect, it is not necessary to install a separate member to the lower portion side of the back frame, so that the structure is simplified and the weight reduction is promoted.

According to a third aspect of the disclosure, there is provided the vehicle seat according to the first or second aspect, wherein the standing wall portion and the abutting wall portion are respectively provided in pairs to face each other with the rotating shaft located therebetween.

According to the third aspect, since the standing wall portions and the abutting wall portions are provided and abutted to face each other with the rotating shaft located therebetween, the connecting strength can be enhanced in a well-balanced manner.

According to a fourth aspect of the disclosure, there is provided the vehicle seat according to any one of the first to third aspects, wherein the abutting wall portion is connected to the standing wall portion by at least one of mechanical coupling and adhesion in a state of being abutted on the standing wall portion.

According to the fourth aspect, the abutting wall portion is not only abutted on the standing wall portion but also connected to the standing wall portion by at least one of mechanical coupling and adhesion, so that strength against the torsional moment is further increased.

According to a fifth aspect of the disclosure, there is provided the vehicle seat according to any one of the first to fourth aspects, wherein the back frame is made of a composite resin material.

According to the fifth aspect, the weight reduction can be further achieved by reducing the weight of a back frame main body.

According to a sixth aspect of the disclosure, there is provided the vehicle seat according to any one of the first to fourth aspects, wherein the back frame is made of a light alloy.

According to the sixth aspect, the weight reduction can be further achieved by reducing the weight of a back frame main body.

What is claimed is:

1. A vehicle seat comprising:
a cushion frame;
a back frame made of a non-ferrous material;
a recliner which is arranged between a rear portion side of the cushion frame and a lower portion side of the back frame and supports the back frame to be relatively rotatable with respect to the cushion frame; and
a clamping plate which clamps the back frame together with the recliner so as to fix the back frame with the recliner,
wherein, on a surface of the recliner facing the back frame, a plurality of projection portions which are disposed on a circumference of a circle around a rotating shaft of the recliner are provided,
wherein the lower portion side of the back frame is provided with: a loosely fitted through hole into which the projection portion is loosely fitted; and a standing wall portion arranged at a position which is away from the rotating shaft than the loosely fitted through hole in a radial direction and extending in a direction substantially perpendicular to the radial direction and toward the clamping plate side,
wherein the clamping plate is provided with: a burring portion to which the projection portion is fitted from an inner side thereof and an outer side thereof is fitted to the loosely fitted through hole of the back frame; and an abutting wall portion which is planarly abutted on the standing wall portion from an inner side in the radial direction,
wherein the clamping plate is fixed to the recliner in a state where the clamping plate and the recliner clamp the back frame by fitting the outer side of the burring portion to the loosely fitted through hole, fitting the inner side of the burring portion to the projection portion, and causing the abutting wall portion to be abutted on the standing wall portion,
wherein the abutting wall portion includes front and rear abutting wall portions and upper and lower abutting wall portions,
wherein the standing wall portion includes a pair of flange portions provided on the lower portion side of the back frame and a pair of cut-and-raised portions provided on the lower portion side of the back frame, and
wherein the front and rear abutting wall portions are respectively planarly abutted on the pair of flange portions, and the upper and lower abutting wall portions are respectively planarly abutted on the pair of cut-and-raised portions.

2. The vehicle seat according to claim 1, wherein the pair of flange portions and the front and rear abutting wall portions respectively face each other with the rotating shaft located therebetween.

3. The vehicle seat according to claim 1, wherein the abutting wall portion is connected to the standing wall portion by at least one of mechanical coupling and adhesion in a state of being abutted on the standing wall portion.

4. The vehicle seat according to claim 1, wherein the back frame is made of a composite resin material.

5. The vehicle seat according to claim 1, wherein the back frame is made of a light alloy.

6. The vehicle seat according to claim 1, wherein the pair of cut-and-raised portions and the upper and lower abutting wall portions respectively face each other with the rotating shaft located therebetween.

* * * * *